(12) United States Patent
Choi et al.

(10) Patent No.: US 11,820,874 B2
(45) Date of Patent: Nov. 21, 2023

(54) POLYAMIDE-BASED FILM, PREPARATION METHOD THEREOF, AND COVER WINDOW COMPRISING SAME

(71) Applicant: SK microworks Co., Ltd., Gyeonggi-do (KR)

(72) Inventors: Sang Hun Choi, Seoul (KR); Jin Woo Lee, Seoul (KR); Dae Seong Oh, Seoul (KR); Jung Hee Ki, Gyeonggi-do (KR); Sunhwan Kim, Incheon (KR); Han Jun Kim, Gyeonggi-do (KR); Heung Sik Kim, Seoul (KR)

(73) Assignee: SK Microworks Co., LTD., Gyeonggi-do (KR)

( * ) Notice: Subject to any disclaimer, the term of this patent is extended or adjusted under 35 U.S.C. 154(b) by 129 days.

(21) Appl. No.: 16/913,300

(22) Filed: Jun. 26, 2020

(65) Prior Publication Data

US 2020/0407522 A1 Dec. 31, 2020

(30) Foreign Application Priority Data

Jun. 28, 2019 (KR) .................. 10-2019-0078286
Oct. 22, 2019 (KR) .................. 10-2019-0131540
Feb. 7, 2020 (KR) .................. 10-2020-0014855

(51) Int. Cl.
| | |
|---|---|
| *C08J 5/18* | (2006.01) |
| *C08G 73/14* | (2006.01) |
| *C08K 3/30* | (2006.01) |
| *G02B 1/00* | (2006.01) |
| *C08G 69/26* | (2006.01) |
| *G02F 1/13363* | (2006.01) |

(52) U.S. Cl.
CPC .............. *C08J 5/18* (2013.01); *C08G 69/265* (2013.01); *C08G 73/14* (2013.01); *C08K 3/30* (2013.01); *G02B 1/00* (2013.01); *C08J 2377/06* (2013.01); *C08K 2003/3045* (2013.01); *C08K 2201/003* (2013.01); *C08K 2201/011* (2013.01); *C08K 2201/019* (2013.01); *G02F 1/13363* (2013.01)

(58) Field of Classification Search
CPC ...................................... C08G 73/14
See application file for complete search history.

(56) References Cited

U.S. PATENT DOCUMENTS

| | | | |
|---|---|---|---|
| 2015/0152232 A1* | 6/2015 | Ju | ............... C08J 5/18 524/442 |
| 2017/0130004 A1* | 5/2017 | Choi | ....... C08G 73/14 |

FOREIGN PATENT DOCUMENTS

| | | | |
|---|---|---|---|
| CN | 109181622 A * | 1/2019 | |
| JP | 6164330 B2 | 7/2017 | |
| KR | 10-2012-0055657 A1 | 5/2012 | |
| KR | 10-2015-0108263 A | 9/2015 | |
| KR | 1831884 B1 * | 2/2018 | ............. B29C 39/24 |
| KR | 10-1839293 B1 | 3/2018 | |
| KR | 10-2018-0092300 A | 8/2018 | |

* cited by examiner

Primary Examiner — Vickey Nerangis
(74) Attorney, Agent, or Firm — IP & T GROUP LLP

(57) ABSTRACT

Embodiments relate to a polyamide-based film that is colorless and transparent, is excellent in mechanical properties and optical properties, has a wide angle of view by securing at least a certain level of luminance at various angles, and, in particular, has gloss characteristics similar to those of glass, a process for preparing the same, and a cover window comprising the same. The polyamide-based film comprises a polyamide-based polymer, wherein when the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more.

9 Claims, 4 Drawing Sheets

POLYAMIDE-BASED FILM, PREPARATION METHOD THEREOF, AND COVER WINDOW COMPRISING SAME

The present application claims priority of Korean patent application numbers 10-2019-0078286 filed on Jun. 28, 2019, 10-2019-0131540 filed on Oct. 22, 2019 and 10-2020-0014855 filed on Feb. 7, 2020. The disclosure of each of the foregoing applications is incorporated herein by reference in its entirety.

TECHNICAL FIELD

Embodiments relate to a polyamide-based film that is colorless and transparent, is excellent in mechanical properties and optical properties, has a wide angle of view by securing at least a certain level of luminance at various angles, and, in particular, has gloss characteristics similar to those of glass, a process for preparing the same, and a cover window comprising the same.

BACKGROUND ART OF THE INVENTION

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

When the polyimide-based film is applied to a cover window and a display device, there arises a problem that the angle of view is lost and that when viewed from the side of the screen, there is lack of the angle of view in which the original color of the screen is not properly implemented. In addition, a transparent cover window employed in a display device comprises a hard-coating layer and a base film. In the course of forming the hard-coating layer, there may arise a problem that the haze increases or the adhesive strength decreases, resulting in a deterioration in the optical properties. Since the glossiness of the polyimide-based film is higher than that of glass, it is difficult to use it as a substitute for glass.

Further, as the size of a display screen is larger and larger, it would be more common to view the screen from the side rather than the front of the screen. Thus, there has been a continuous demand for research on the development of a film that can secure a wide angle of view and research on the development of a film that has a similar level of glossiness to that of glass, as well as excellent mechanical properties and optical properties.

DISCLOSURE OF THE INVENTION

Problem to be Solved

Embodiments aim to provide a polyamide-based film that is colorless and transparent, is excellent in mechanical properties and optical properties, has a wide angle of view by securing at least a certain level of luminance at various angles, and, in particular, has gloss characteristics similar to those of glass, a process for preparing the same, and a cover window comprising the same.

Solution to the Problem

The polyamide-based film according to an embodiment comprises a polyamide-based polymer, wherein when the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more.

The cover window for a display device according to another embodiment comprises a polyamide-based film and a functional layer, wherein the polyamide-based film comprises a polyamide-based polymer, and when the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more.

The polyamide-based film according to an embodiment comprises a polyamide-based polymer, wherein the film surface has a glossiness at 20° ($GL_{20}$) of 90 to 130, a glossiness at 60° ($GL_{60}$) of 90 to 120, and a glossiness at 85° ($GL_{85}$) of 90 to 110.

The process for preparing a polyamide-based film according to an embodiment comprises preparing a solution comprising a polyamide-based polymer in an organic solvent; adding a filler dispersion in which a filler is dispersed to the solution; charging the solution comprising the filler dispersion into a tank; extruding and casting the solution in the tank and then drying it to prepare a gel sheet; and thermally treating the gel sheet.

Advantageous Effects of the Invention

The polyamide-based film according to an embodiment not only is excellent in optical properties in terms of high transmittance, low haze, and low yellow index, but also can secure a wide angle of view by virtue of at least a certain level of luminance at various angles.

In particular, since the polyamide-based film according to an embodiment has a high luminance at an angle of about 50°, it may have an enhanced angle of view. When a general user views a display device from the side, it is likely that the angle between the user's viewing direction and the normal line of the display surface is about 50°. Thus, when the polyamide-based film according to an embodiment is applied to a cover window, it may have a high lateral angle of view.

In addition, the polyamide-based film according to an embodiment can minimize the optical distortion since it has at most a certain level of in-plane retardation and a thickness direction retardation and can also reduce the light leakage from the side.

In particular, as the screen size of a display device is larger, it is more common to view the screen from the side. When the polyamide-based film according to an embodiment is applied to a display device, it may have excellent visibility even from the side, so that it can be advantageously applied to a large-sized display device.

Since the polyamide-based film according to an embodiment is colorless, transparent, and excellent in mechanical properties and optical properties and, in particular, has gloss characteristics similar to those of glass, it can be advantageously applied to a cover window for a display device and to a display device.

Further, the polyamide-based film according to an embodiment is excellent in folding characteristics, so that it can be advantageously applied to a foldable display device or a flexible displace device.

DETAILED DESCRIPTION FOR CARRYING OUT THE INVENTION

Figure 1:
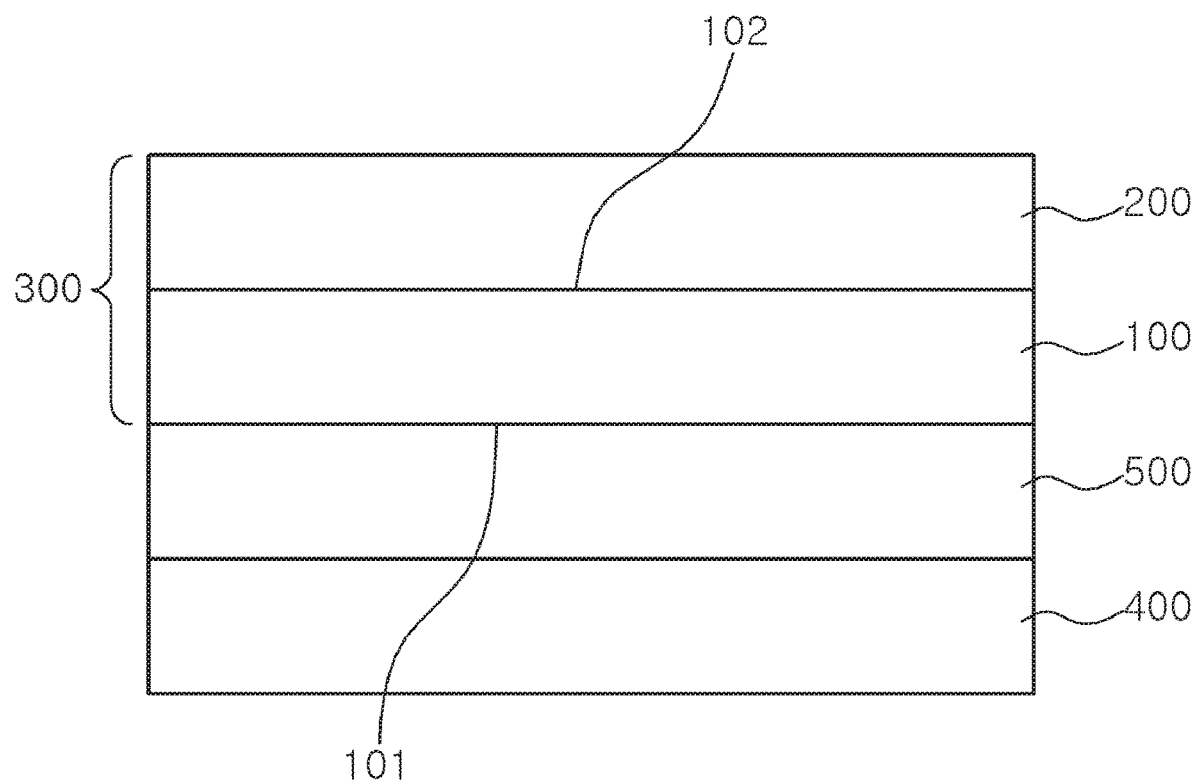
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

Embodiments provide a polyamide-based film that not only is excellent in optical properties in terms of high transmittance, low haze, and low yellow index, but also can have a wide angle of view by securing at least a certain level of luminance at various angles.

In addition, embodiments provide a polyamide-based film that is colorless, transparent, and excellent in mechanical properties and optical properties and, in particular, has gloss characteristics similar to those of glass.

The polyamide-based film according to an embodiment comprises a polyamide-base polymer.

When the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more.

Specifically, the luminance value ($L_{50}$) measured in the direction of 50° from the normal direction of the surface light source is 26% or more, 26.5% or more, or 27% or more.

When the polyamide-based film is placed on a surface light source, light is irradiated from the surface light source, and the luminance value ($L_0$) measured in the normal direction of the surface light source is 100%, the luminance value ($L_{60}$) measured in the direction of 60° from the normal direction of the surface light source is 19% or more or 20% or more.

When the polyamide-based film is placed on a surface light source, light is irradiated from the surface light source, and the luminance value ($L_0$) measured in the normal direction of the surface light source is 100%, the luminance value ($L_{10}$) measured in the direction of 100 from the normal direction of the surface light source is 93% or more.

When the polyamide-based film is placed on a surface light source, light is irradiated from the surface light source, and the luminance value ($L_0$) measured in the normal direction of the surface light source is 100%, the luminance value ($L_{20}$) measured in the direction of 200 from the normal direction of the surface light source is 70% or more or 71% or more.

When the polyamide-based film is placed on a surface light source, light is irradiated from the surface light source, and the luminance value ($L_0$) measured in the normal direction of the surface light source is 100%, the luminance value ($L_{30}$) measured in the 30° direction from the normal direction of the surface light source is 44% or more or 45% or more.

When the polyamide-based film is placed on a surface light source, light is irradiated from the surface light source, and the luminance value ($L_0$) measured in the normal direction of the surface light source is 100%, the luminance value ($L_{40}$) measured in the direction of 400 from the normal direction of the surface light source is 32% or more or 33% or more.

Figure 4:
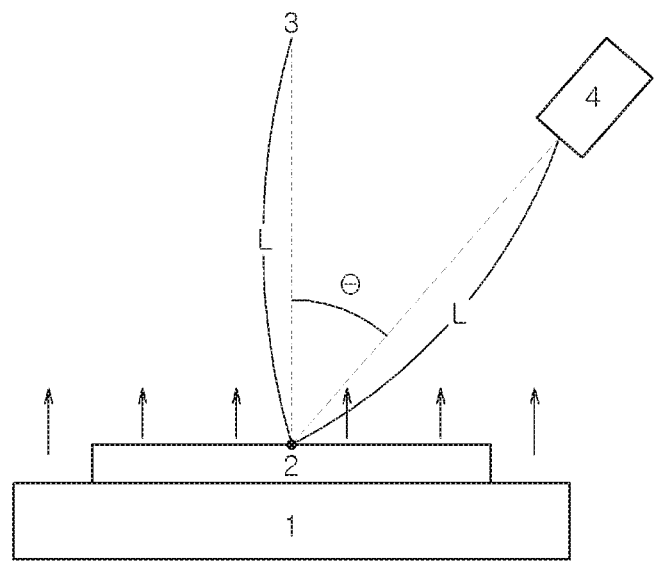
FIG. 4 schematically illustrates a method for measuring the luminance with respect to the angle of a polyamide-based film according to an embodiment.

FIG. 4 schematically illustrates a method for measuring the luminance with respect to the angle of a polyamide-based film according to an embodiment.

Specifically, FIG. 4 illustrates a surface light source (1), a polyamide-based film (2) placed on the surface light source, the normal line (3) of the surface light source, and a luminance meter (4).

More specifically, when the point where the polyamide-based film meets the normal line is referred to as a center point, the luminance meter is positioned at a distance L from the center point in the normal direction to measure the luminance ($L_0$). In such event, the luminance value thus measured is referred to as an absolute luminance value in the normal direction in a unit of nit.

In addition, while the luminance meter is moved in the circumferential direction with reference to the center point of the surface light source, the absolute luminance value ($L_0$) for each angle is measured at a certain angle (θ) from the normal direction of the surface light source and at a distance from the center point equal to L.

For example, the L may be about 1 m, but it is not limited thereto.

The luminance for each angle as described above is a value converted based on the luminance value ($L_0$) measured in the normal direction of the surface light source as 100%.

The polyamide-based film according to an embodiment has an absolute luminance value in the normal direction of 5,800 to 6,200 nits, 5,900 to 6,100 nits, or 5,900 to 6,000 nits.

When the polyamide-based film is placed on a surface light source, light is irradiated from the surface light source, and the luminance value ($L_0$) measured in the normal direction of the surface light source is 100%, if the luminance values measured in the directions at certain angles from the normal direction of the surface light source are within the above ranges, a display device to which the film is applied has excellent visibility not only from the front but also from the side.

Meanwhile, when a film having a low luminance when the angle is large from the normal direction, it may cause a change in the color tone of an image when applied to a display device, and as the screen size of the display device is larger, the lateral luminance is lower, and the unevenness of luminance is severe.

The polyamide-based film according to an embodiment has at least a certain level of luminance from the side, specifically, a luminance value ($L_{50}$) measured in the direction of 50° from the normal direction of the surface light source of 25% or more and a luminance value ($L_{60}$) measured in the direction of 60° of 19% more. Thus, the unevenness of luminance between the front and side can be minimized, and a wide angle of view can be secured.

In particular, since the polyamide-based film according to an embodiment has a high luminance at an angle of about 50°, it may have an enhanced angle of view. When a general user views a display device from the side, it is likely that the angle between the user's viewing direction and the normal line of the display surface is about 50°. Thus, when the polyamide-based film according to an embodiment is applied to a cover window, it may have a high lateral angle of view.

As the screen size of a display device is larger, it is more common to view the screen from the side. In the case of a portable display such as a tablet-type computer or a smartphone, it is becoming more common to change the viewing direction of the display in various ways depending on the posture to look at it. Thus, it is important to enhance the display performance of the angle of view in all directions. The polyamide-based film according to an embodiment secures a wide angle of view, improves the unevenness of luminance, and minimizes the optical distortion, so that it is advantageous for application to various display devices.

The polyamide-based film according to an embodiment has an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-based film has a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-based film has a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-based film are within the above ranges, when the film is applied to a display device, its visibility is excellent not only from the front but also from the side, so that a wide angle of view can be achieved.

The polyamide-based film according to an embodiment has an in-plane retardation ($R_o$) of 800 nm or less. Specifically, the in-plane retardation ($R_o$) of the polyamide-based film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-based film according to an embodiment has a thickness direction retardation ($R_{th}$) of 5,000 nm or less. Specifically, the thickness direction retardation ($R_{th}$) of the polyamide-based film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}$ ($= |n_x - n_z|$) and $\Delta n_{yz}$ ($= |n_y - n_z|$) observed on a cross-section in the film thickness direction and the film thickness (d).

If the in-plane retardation and the thickness direction retardation of the polyamide-based film are within the above ranges, when the film is applied to a display device, it is possible to minimize the optical distortion and color distortion and can also minimize the light leakage from the side.

The surface of the polyamide-based film has a glossiness at 20° ($GL_{20}$) of 90 to 130.

Specifically, the glossiness at 20° ($GL_{20}$) of the surface of the polyamide-based film may be 95 to 130, 90 to 125, 95 to 125, 95 to 120, 95 to 115, 95 to 110, 95 to 105, or 95 to 100, but it is not limited thereto.

The surface of the polyamide-based film has a glossiness at 60° ($GL_{60}$) of 90 to 120.

Specifically, the glossiness at 60° ($GL_{60}$) of the surface of the polyamide-based film may be 95 to 120, 95 to 115, 95 to 110, 95 to 105, or 95 to 100, but it is not limited thereto.

The surface of the polyamide-based film has a glossiness at 85° ($GL_{85}$) of 90 to 110.

Specifically, the glossiness at 85° ($GL_{85}$) of the surface of the polyamide-based film may be 90 to 105, 95 to 110, 95 to 105, 98 to 105, 98 to 102, 99 to 101, or 100 to 101, but it is not limited thereto.

If the glossiness at 20 ($GL_{20}$), the glossiness at 60 ($GL_{60}$), and the glossiness at 85° ($GL_{85}$) of the surface of the polymer film are within the above ranges, it has gloss characteristics similar to those of glass, so that it can realize an aesthetic feeling similar to that of glass. In addition, as compared with the conventional films, it produces the effect of enhanced visibility of a display. Further, it can secure lightweight as compared with glass.

In particular, if the glossiness at 60° ($GL_{60}$) of the surface of the polymer film is within the above range, this property is of more significance since this angle is an angle generally recognized by the human eyes. The glossiness at 60 ($GL_{60}$) shows gloss characteristics similar to those of glass, so that it can achieve an aesthetic feeling similar to that of glass and produces the effect of enhanced visibility of a display.

If the glossiness at 20° ($GL_{20}$), the glossiness at 60° ($GL_{60}$), and the glossiness at 850 ($GL_{85}$) of the surface of the polymer film are outside the above ranges, it looks similar to the conventional films and there arises a problem of a poor aesthetic feeling and poor visibility due to light reflection in the display.

The polyamide-based film has a $GL_{20-60}$ value defined in the following Equation 1 of 0 to 15.

$$GL_{20-60} = |GL_{20} - GL_{60}| \qquad \text{[Equation 1]}$$

In Equation 1, $GL_{20}$ is the glossiness at 20° of the film surface, and $GL_{60}$ is the glossiness at 60° of the film surface.

Specifically, the $GL_{20-60}$ value of the polyamide-based film may be 0 to 10, 0 to 9, 0 to 8, 0 to 7, 0 to 6, 0 to 5, 0 to 3, 0 to 2, 0 to 1, or 0.5 to 1, but it is not limited thereto.

The polyamide-based film has a $GL_{60-85}$ value defined in the following Equation 2 of 0 to 15.

$$GL_{60-85} = |GL_{60} - GL_{85}| \qquad \text{[Equation 2]}$$

In Equation 2, $GL_{60}$ is the glossiness at 60° of the film surface, and $GL_{85}$ is the glossiness at 85° of the film surface.

Specifically, the $GL_{60-85}$ value of the polyamide-based film may be 0 to 13, 0 to 12, 0 to 11, 0 to 10, 0 to 9, 0 to 8, 0 to 7, 0 to 6, 0 to 5, 0 to 4, 0 to 3, 0.5 to 3, 1 to 3, or 1 to 2.5, but it is not limited thereto.

The polyamide-based film has a $GL_{20-85}$ value defined in the following Equation 3 of 0 to 30.

$$GL_{20-85} = |GL_{20} - GL_{85}| \qquad \text{[Equation 3]}$$

In Equation 3, $GL_{20}$ is the glossiness at 200 of the film surface, and $GL_{85}$ is the glossiness at 85° of the film surface.

Specifically, the $GL_{20-85}$ value of the polyamide-based film may be 0 to 25, 0 to 23, 0 to 22, 0 to 20, 0 to 18, 0 to 15, 1 to 15, 1 to 12, 1 to 10, 1 to 8, 1 to 6, 1 to 5, 1 to 3, or 2 to 3, but it is not limited thereto.

The polyamide-based film has a $GL_{max/min}$ value defined in the following Equation 4 of 80% to 100%.

$$GL_{max/min}(\%) = (GL_{min}/GL_{max}) \times 100 \qquad \text{[Equation 4]}$$

In Equation 4, $GL_{max}$, is the highest glossiness among $GL_{20}$, $GL_{60}$, and $GL_{85}$, and $GL_{min}$ is the lowest glossiness among $GL_{20}$, $GL_{60}$, and $GL_{85}$.

Specifically, the $GL_{max/min}$ value of the polyamide-based film may be 85% to 100%, 88% to 100%, 90% to 100%, 92% to 100%, 93% to 100%, 94% to 100%, 95% to 100%, 90% to 98%, 95% to 98%, 96% to 98%, or 97% to 98%, but it is not limited thereto.

If the $GL_{20-60}$ value, $GL_{60-85}$ value, $GL_{20-85}$ value, and $GL_{max/min}$ value of the polymer film are within the above ranges, the difference in glossiness with respect to the angle is not large, so that when applied to a cover window and a display device, it produces the effect of enhanced visibility of the display. In addition, it has gloss characteristics similar to those of glass, so that it can achieve an aesthetic feeling similar to that of glass.

In addition, the polyamide-based film has an IS value represented by the following Equation 5 of 10 to 100.

$$IS = IM + \frac{RS}{10} \qquad \text{[Equation 5]}$$

In Equation 5, IM stands for the number of moles of the imide repeat unit when the total number of moles of the imide repeat unit and the amide repeat unit in the film is 100; and RS stands for the content (ppm) of the residual solvent in the film.

For example, the IS value may be 10 to 150, 10 to 120, or 10 to 60, but it is not limited thereto.

If the IS value of the polyamide-based film satisfies the above range, it is possible to obtain a film that has excellent durability under severe conditions, is excellent in folding characteristics, and has a level of glossiness similar to that of glass.

The polyamide-based film comprises a filler in addition to the polyamide-base polymer.

The filler has an average particle diameter of 60 nm to 180 nm. Specifically, the average particle diameter of the filler may be 80 nm to 180 nm, 100 nm to 180 nm, 110 nm to 160 nm, 120 nm to 160 nm, or 130 nm to 150 nm, but it is not limited thereto.

If the average particle diameter of the filler is within the above range, the optical properties are not deteriorated even when a relatively large amount thereof is employed as compared with other inorganic fillers.

The filler has a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles is improved.

On the other hand, if the refractive index of the filler is outside the above range, there may arise a problem that the filler is visually noticeable on the film or that the haze is increased due to the filler.

The content of the filler is 100 to 3,000 ppm based on the total weight of the solids content of the polyamide-based polymer. Specifically, the content of the filler may be 100 ppm to 2,500 ppm, 100 ppm to 2,200 ppm, 200 ppm to 2,500 ppm, 200 ppm to 2,200 ppm, 250 ppm to 2,100 ppm, or 300 ppm to 2,000 ppm, based on the total weight of the solids content of the polyamide-based polymer, but it is not limited thereto.

If the content of the filler is outside the above range, the haze of the film is rapidly increased, and the filler may aggregate with each other on the surface of the film, so that a feeling of foreign matter may be visually observed, or it may cause trouble in the sliding performance or deteriorate the windability in the preparation process.

The filler may be barium sulfate.

The barium sulfate may be employed in the form of particles. In addition, the surface of barium sulfate particles is not specially treated with coating, and they may be uniformly dispersed in the entire film.

Since the polymer film comprises barium sulfate, the film can secure a wide angle of view without a deterioration in the optical properties.

According to another embodiment, the polyamide-based film may further comprise a matting agent.

The matting agent may be at least one selected from the group consisting of silica, poly(methyl methacrylate) (PMMA), poly(butyl methacrylate) (PBMA), polystyrene (PS), melamine, silicone, and glass.

The matting agent may have an average particle diameter of 10 nm to 1,000 nm.

For example, the average particle diameter of the matting agent may be 50 nm to 800 nm, 50 nm to 500 nm, 50 nm to 300 nm, 50 nm to 200 nm, 70 nm to 180 nm, or 100 nm to 150 nm, but it is not limited thereto.

Since the polyamide-based film comprises the matting agent, it is possible to lower the glossiness, thereby obtaining a film that has a level of glossiness similar to that of glass. Further, it is possible to enhance the effect of improving the scratches caused by sliding during the film preparation by enhancing the surface roughness and windability and to achieve an aesthetic feeling similar to that of glass. Further, it produces the effect of enhancing the visibility by reducing the reflection of the display.

The polyamide-based film may comprise the matting agent in an amount of 100 to 3,000 ppm, or 200 to 1,000 ppm, based on the total weight of the polyamide-based film.

If the content of the matting agent contained in the film exceeds the above range, the matting agent precipitates on the surface of the film to make it unavailable for the subsequent process, or the haze of the film increases, resulting in a significant deterioration in the optical properties.

The content of the residual solvent in the polyamide-based film is 1,500 ppm or less. For example, the content of the residual solvent may be 1,200 ppm or less, 1,000 ppm or less, 800 ppm or less, or 500 ppm or less, but it is not limited thereto.

The residual solvent refers to the amount of solvents that are not volatilized during the film production and remains in the film finally produced.

If the content of the residual solvent in the polyamide-based film exceeds the above range, the durability of the film may be deteriorated, and it may have an impact on the luminance or glossiness.

When the polyamide-based film according to an embodiment based on a thickness of 50 μm is folded to have a radius of curvature of 3 mm, the number of folding before the fracture is 200,000 or more.

The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film according to an embodiment has a surface roughness of 0.01 μm to 0.07 μm. Specifically, the surface roughness may be 0.01 μm to 0.07 μm, or 0.01 μm to 0.06 μm, but it is not limited thereto.

Since the surface roughness of the polyamide-based film satisfies the above range, it is advantageous for achieving high luminance even when the angle from the normal direction of the surface light source increases, it is possible to obtain a film having a level of glossiness similar to that of glass, and it produces the effect of enhanced visibility of the display.

The polyamide-based film according to an embodiment comprises a polyamide-based polymer, and the polyamide-based polymer is a polymer that contains an amide repeat unit. In addition, the polymer contained in the film may optionally comprise an imide repeat unit.

The polyamide-based film comprises a polyamide-base polymer. The polyamide-based polymer may be prepared by simultaneously or sequentially reacting reactants that comprise a diamine compound and a dicarbonyl compound. Specifically, the polyamide-based polymer is prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer comprises an imide repeat unit derived from the polymerization of the diamine compound and the dianhydride compound and an amide repeat unit derived from the polymerization of the diamine compound and the dicarbonyl compound.

The polyamide-based film according to an embodiment comprises a polyamide-based polymer formed by polymerizing a diamine compound, a dicarbonyl compound, and optionally a dianhydride compound.

As an embodiment, the molar ratio of the dianhydride compound and the dicarbonyl compound is 0:100 to 50:50, 0:100 to 45:55, 0:100 to 30:70, 0:100 to 25:75, 0:100 to 20:80, 0:100 to 15:85, 0:100 to 10:90, 0:100 to 8:92, or 0:100 to 5:95.

If the molar ratio of the dianhydride compound and the dicarbonyl compound is within the above range, the film has sufficient luminance and a minimized optical distortion even when the angle from the normal direction of the surface light source is large, it has gloss characteristics similar to those of glass, and it is possible to obtain a film having excellent folding characteristics.

As another embodiment, the dianhydride compound may be composed of zero, one, two, or more types, and the dicarbonyl compound may be composed of one, two, or more types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

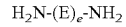  [Formula 1]

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

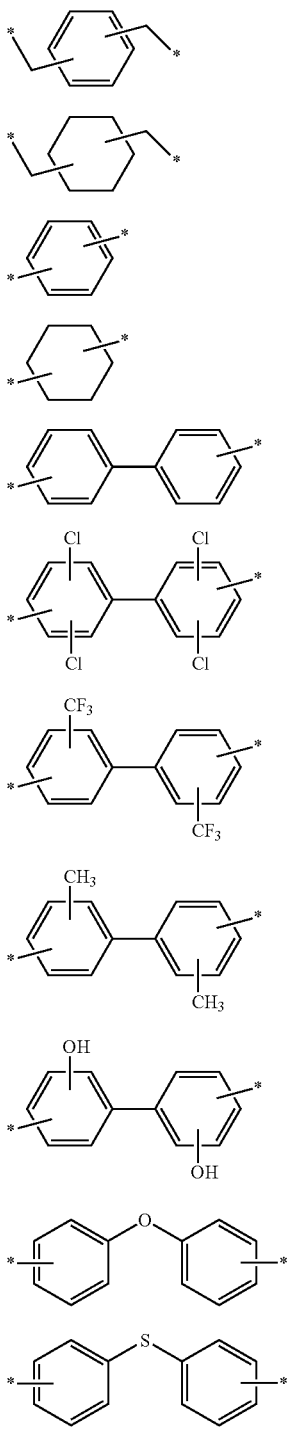

1-1a
1-2a
1-3a
1-4a
1-5a
1-6a
1-7a
1-8a
1-9a
1-10a
1-11a

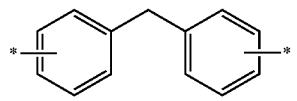

1-12a

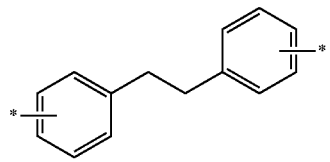

1-13a

1-14a (n is selected from integers of 1 to 12)

Specifically, (E)$_e$ in Formula 1 may be selected from the groups represented by the following Formulae 1-1b to 1-13b, but it is not limited thereto.

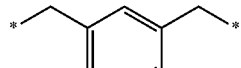

1-1b

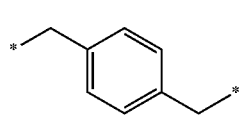

1-2b

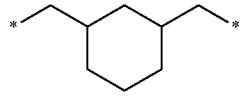

1-3b

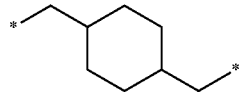

1-4b

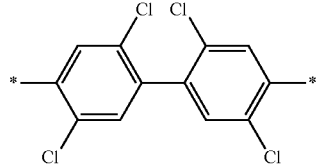

1-5b

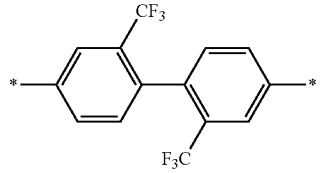

1-6b

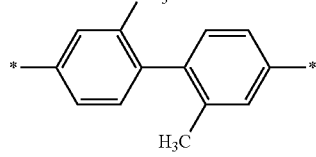

1-7b

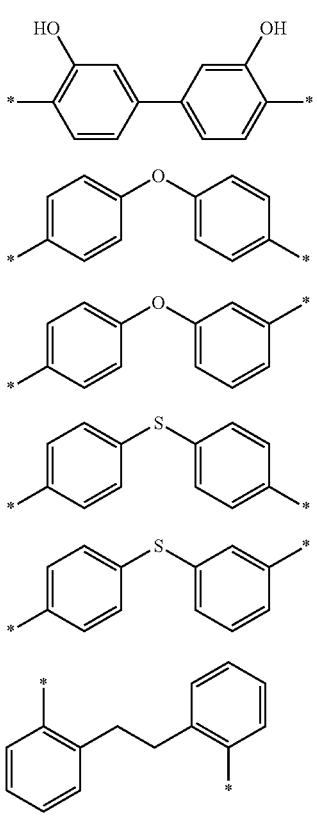

1-8b 1-9b 1-10b 1-11b 1-12b 1-13b

More specifically, (E), in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

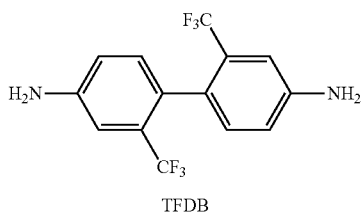

TFDB

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

[Formula 2]

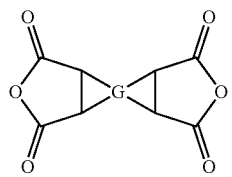

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

2-1a
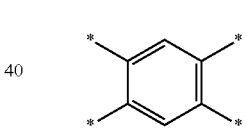

2-2a
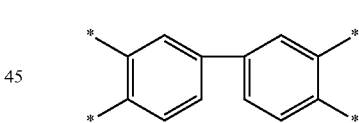

2-3a
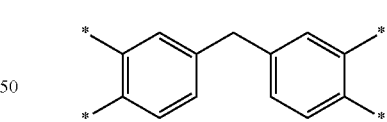

2-4a
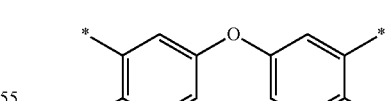

2-5a
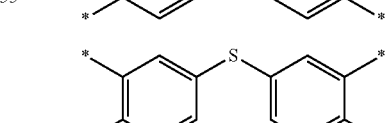

2-6a
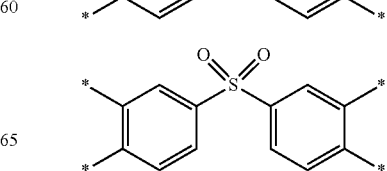

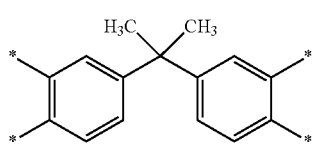

2-7a

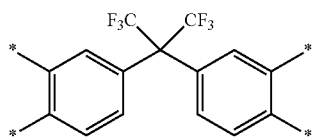

2-8a

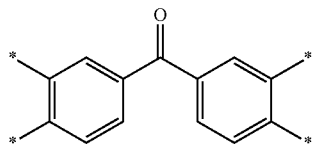

2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6FDA) represented by the following formula, but it is not limited thereto.

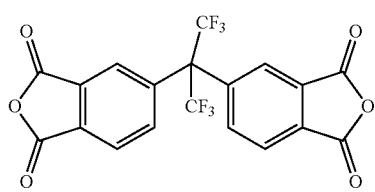

6-FDA

The diamine compound an the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

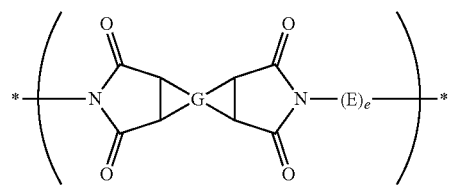

In Formula A, E, G, and e are as described above.

For example, the polyimide may comprise a repeat unit represented by the following Formula A-1, but it is not limited thereto.

[Formula A-1]

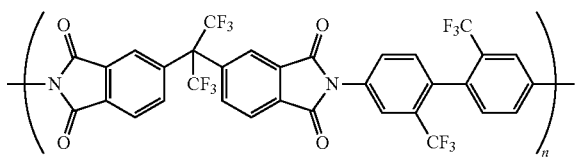

In Formula A-1, n is an integer of 1 to 400.

The dicarbonyl compound is not particularly limited, but it may be, for example, a compound represented by the following Formula 3.

[Formula 3]

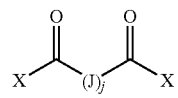

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in Formula 3 may be selected from the groups represented by the following Formulae 3-1a to 3-14a, but it is not limited thereto.

3-1a

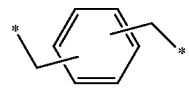

3-2a

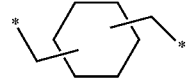

-continued

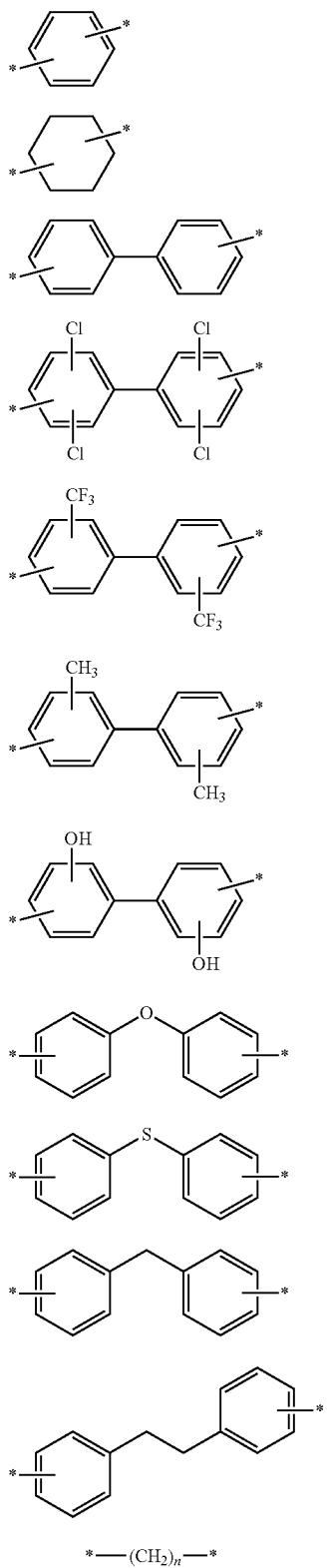

(n is selected from integers of 1 to 12)

Specifically, (J)$_j$ in Formula 3 may be selected from the groups represented by the following Formulae 3-1b to 3-8b, but it is not limited thereto.

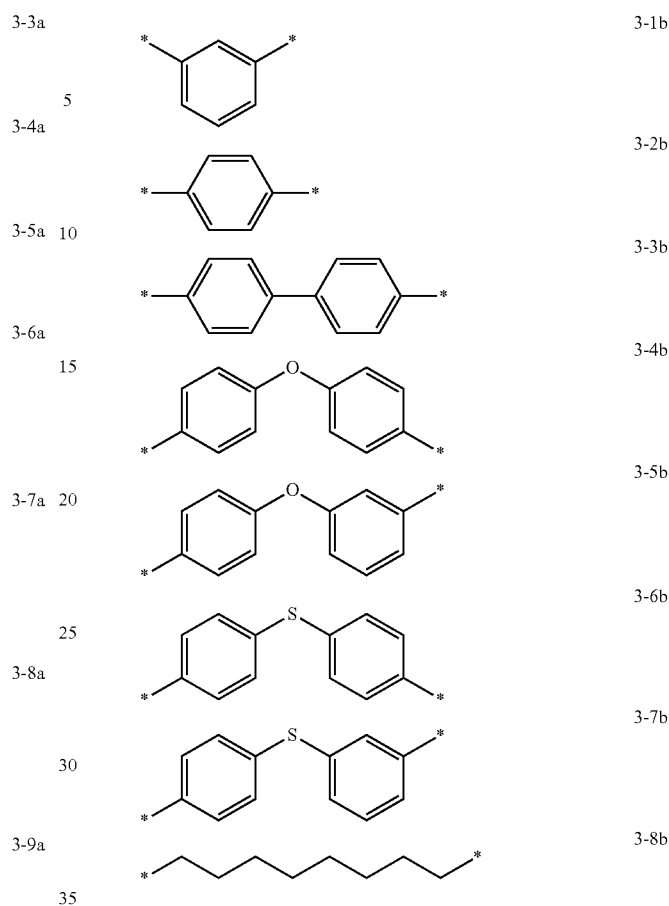

More specifically, (J)$_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which (J)$_j$ in the above Formula 2 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

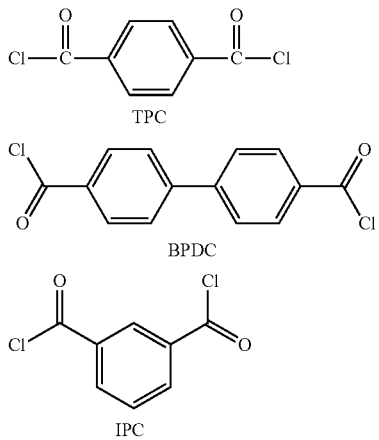

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-based resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-based resin thus produced may not only have high oxidation resistance, but is also economical since the costs can be reduced.

The diamine compound and the dicarbonyl compound may be polymerized to form a repeat unit represented by the following Formula B.

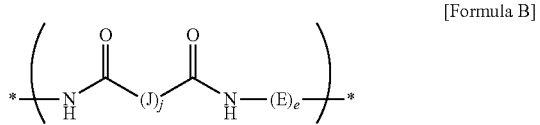
[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

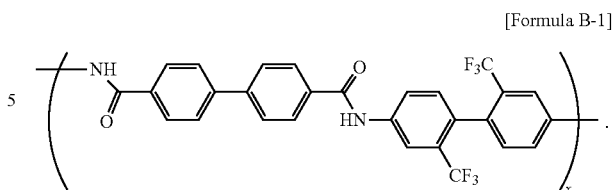
[Formula B-1]

In Formula B-1, x is an integer of 1 to 400

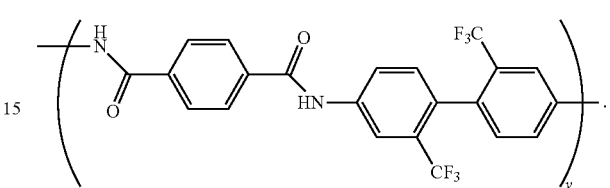
[Formula B-2]

In Formula B-2, y is an integer of 1 to 400

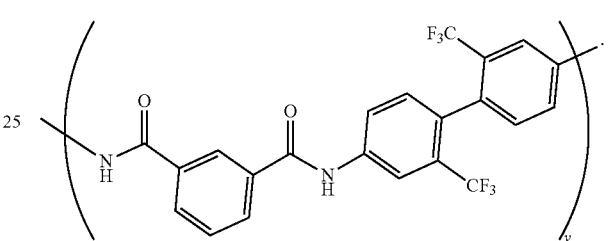
[Formula B-3]

In Formula B-3, y is an integer of 1 to 400

In Formula B-3, y is an integer of 1 to 400.

According to an embodiment, the polyamide-based polymer may comprise a repeat unit represented by the following Formula A and a repeat unit represented by the following Formula B:

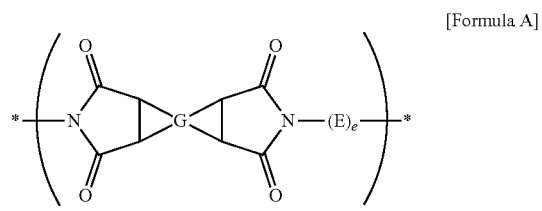
[Formula A]

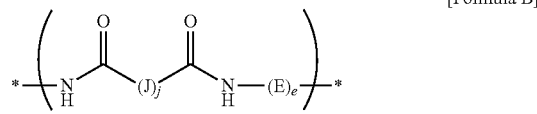
[Formula B]

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_3$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-base polymer, the molar ratio of the repeat unit represented by the above Formula A to the repeat unit represented by the above Formula B may be 0:100 to 50:50, 0:100 to 45:55, 0:100 to 30:70, 0:100 to 25:75, 0:100 to 20:80, 0:100 to 15:85, 0:100 to 10:90, 0:100 to 8:92, or 0:100 to 5:95, but it is not limited thereto.

Alternatively, the molar ratio of the imide-based repeat unit and the amide-based repeat unit in the polyamide-base polymer may be 0:100 to 50:50, 0:100 to 45:55, 0:100 to 30:70, 0:100 to 25:75, 0:100 to 20:80, 0:100 to 15:85, 0:100 to 10:90, 0:100 to 8:92, or 0:100 to 5:95, but it is not limited thereto.

If the polyamide-based polymer comprises the repeat unit represented by Formula A and the repeat unit represented by Formula B at a molar ratio within the above range, or the imide-based repeat unit and the amide-based repeat unit at a molar ratio within the above range, it has sufficient luminance even when the angle from the normal direction of the surface light source is large, it minimizes the optical distortion, it has gloss characteristics similar to those of glass and excellent folding characteristics, and it is possible to obtain a film having excellent mechanical properties and optical properties.

The polyamide-based film has a haze of 1% or less. For example, the haze may be 0.8% or less, 0.6% or less, 0.5% or less, or 0.4% or less, but it is not limited thereto.

The polyamide-based film has a transmittance of 80% or more. For example, the transmittance may be 82% or more, 85% or more, 88% or more, 89% or more, 80% to 99%, 88% to 99%, or 89% to 99%, but it is not limited thereto.

The polyamide-based film has a yellow index of 5 or less. For example, the yellow index may be 4 or less, 3.5 or less, or 3 or less, but it is not limited thereto.

The polyamide-based film has a modulus of 5.0 GPa or more. Specifically, the modulus may be 5.5 GPa or more, 6.0 GPa or more, 6.5 GPa or more, or 7.0 GPa or more, but it is not limited thereto.

The polyamide-based film has a compressive strength of 0.4 kgf/μm or more. Specifically, the compressive strength may be 0.45 kgf/μm or more, or 0.46 kgf/μm or more, but it is not limited thereto.

When the polyamide-based film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-based film has a surface hardness of HB or higher. Specifically, the surface hardness may be H or higher, or 2H or higher, but it is not limited thereto.

The polyamide-based film has a tensile strength of 15 kgf/mm$^2$ or more. Specifically, the tensile strength may be 18 kgf/mm$^2$ or more, 20 kg/mm$^2$ or more, 21 kgf/mm$^2$ or more, or 22 kgf/mm$^2$ or more, but it is not limited thereto.

The polyamide-based film has an elongation of 15% or more. Specifically, the elongation may be 16% or more, 17% or more, or 17.5% or more, but it is not limited thereto.

The polyamide-based film according to an embodiment not only is excellent in optical properties in terms of low haze, low yellow index (YI), and high transmittance, but also has sufficient luminance over a wide angle of view and a minimized optical distortion, thereby producing the effect of enhancing the aesthetic feeling and visibility.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

For example, the polyamide-based film comprises a polyamide-based polymer and has a transmittance of 80% or more, a haze of 1% or less, and a yellow index of 5 or less.

As another example, the polyamide-based film comprises a polyamide-based polymer, wherein the film surface has a glossiness at 20° (GL$_{20}$) of 90 to 130, a glossiness at 60° (GL$_{60}$) of 90 to 120, and a glossiness at 85° (GL$_{85}$) of 90 to 110, and the GL$_{20-60}$ value defined in the above Equation 1 is 0 to 15, or the GL$_{20-85}$ value defined in the above Equation 3 is 0 to 30.

In addition, the properties of the polyamide-based film as described above are the results materialized by combinations of the chemical and physical properties of the components, which constitute the polyamide-based film, along with the conditions in each step of the process for preparing the polyamide-based film as described below.

For example, the composition and content of the components that constitute the polyamide-based film, the types and contents of additives (specifically, fillers, matting agent, and the like), the surface roughness, the stretching ratio in the film preparation process, thermal treatment conditions, cooling temperature conditions, and the like are all combined to achieve the desired level of luminance and glossiness.

Cover Window for a Display Device

The cover window for a display device according to an embodiment comprises a polyamide-based film and a functional layer.

The polyamide-based film comprises a polyamide-based polymer, wherein when the polyamide-based film is placed on a surface light source, light is irradiated from the surface light source, and the luminance value (L$_0$) measured in the normal direction of the surface light source is 100%, the luminance value (L$_{50}$) measured in the direction of 50 from the normal direction of the surface light source is 25% or more.

The details on the polyamide-based film are as described above.

The cover window for a display device may be advantageously applied to a display device.

The polyamide-based film has a wide angle of view by securing at least a certain level of luminance at various angles, a minimized optical distortion, and gloss characteristics similar to those of glass. Thus, it can be advantageously applied to a cover window for a display device.

Display Device

The display device according to an embodiment comprises a display unit; and a cover window disposed on the display unit, wherein the cover window comprises a polyamide-based film and a functional layer.

The polyamide-based film comprises a polyamide-based polymer, wherein when the polyamide-based film is placed on a surface light source, light is irradiated from the surface light source, and the luminance value ($L_0$) measured in the normal direction of the surface light source is 100%, the luminance value ($L_{50}$) measured in the direction of 50 from the normal direction of the surface light source is 25% or more.

The details on the polyamide-based film and the cover window are as described above.

FIG. 1 is a cross-sectional view of a display device according to an embodiment.

Specifically, FIG. 1 illustrates a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display device (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) is disposed on the display unit (400). The cover window is located at the outermost position of the display device according to an embodiment to thereby protect the display panel.

The cover window (300) may comprise a polyamide-based film and a functional layer. The functional layer may be at least one selected from the group consisting of a hard coating, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a wide angle of view and excellent visibility. Since neither significant process changes nor cost increases are needed, it is advantageous in that the production costs can be reduced.

The polyamide-based film according to an embodiment not only is excellent in optical properties in terms of high transmittance, low haze, and low yellow index, but also can secure a wide angle of view by virtue of at least a certain level of luminance at various angles.

In particular, since the polyamide-based film according to an embodiment has a high luminance at an angle of about 50°, it may have an enhanced angle of view. When a general user views a display device from the side, it is likely that the angle between the user's viewing direction and the normal line of the display surface is about 50°. Thus, when the polyamide-based film according to an embodiment is applied to a cover window, it may have a high lateral angle of view.

In addition, the polyamide-based film according to an embodiment can minimize the optical distortion since it has at most a certain level of in-plane retardation and a thickness direction retardation and can also reduce the light leakage from the side.

In particular, as the screen size of a display device is larger, it is more common to view the screen from the side. When the polyamide-based film according to an embodiment is applied to a display device, it may have excellent visibility even from the side, so that it can be advantageously applied to a large-sized display device.

Process for Preparing a Polyamide-Based Film

An embodiment provides a process for preparing a polyamide-based film.

The process for preparing a polyamide-based film according to an embodiment comprises preparing a solution comprising a polyamide-based polymer in an organic solvent; adding a filler dispersion in which a filler is dispersed to the solution; charging the solution comprising the filler dispersion into a tank; extruding and casting the solution in the tank and then drying it to prepare a gel sheet; and thermally treating the gel sheet.

The process for preparing a polymer film according to another embodiment comprises preparing a polyamide-based polymer solution in an organic solvent; transferring the polymer solution to a tank; casting the polymer solution in the tank onto a belt and then drying it to prepare a gel-sheet; thermally treating the gel-sheet while it is moved to prepare a cured film; and cooling the cured film while it is moved.

Figure 2:
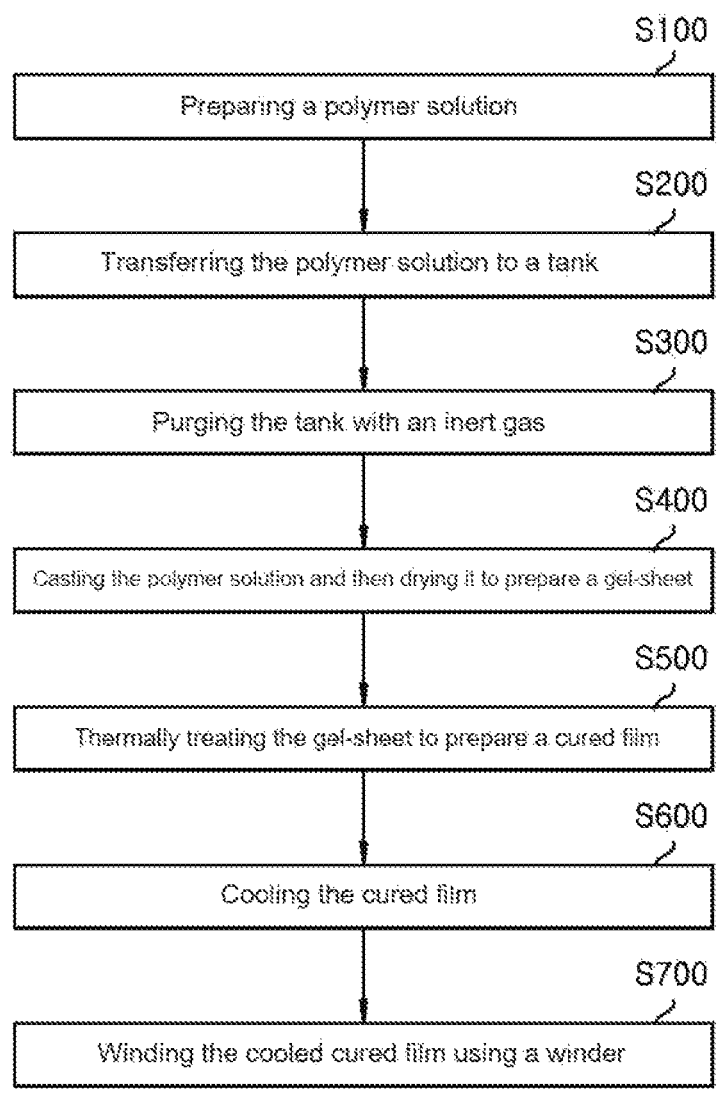
FIG. 2 is a schematic flow diagram of a process for preparing a polyamide-based film according to an embodiment.

Referring to FIG. 2, the process for preparing a polyamide-based film comprises simultaneously or sequentially mixing a diamine compound and a dicarbonyl compound, or a diamine compound, a dianhydride compound, and a dicarbonyl compound, in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel sheet (S400); thermally treating the gel sheet while it is moved to prepare a cured film (S500); cooling the cured film while it is moved (S600); and winding the cooled cured film using a winder (S700).

The polyamide-based film is a film that comprises a polyamide-based resin as a main component. The polyamide-based resin is a resin that comprises an amide repeat unit as a structural unit. In addition, the polyamide-based film may comprise an imide repeat unit.

In the process for preparing a polyamide-based film, a polymer solution for preparing the polyamide-based resin is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound and a dicarbonyl compound, or a diamine compound, a dianhydride compound, and a dicarbonyl compound, in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

The polymer contained in the polymer solution comprises an amide repeat unit derived from the polymerization of the diamine compound and the dicarbonyl compound.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15% by weight to 25% by weight, but it is not limited thereto.

If the content of solids contained in the polymer solution is within the above range, a polyamide-based film can be effectively produced in the extrusion and casting steps. In addition, the polyamide-based film thus produced may have mechanical properties in terms of an improved modulus and the like and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound and a dicarbonyl compound, or a diamine compound, a dianhydride compound, and a dicarbonyl compound, in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature.

Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

According to another embodiment, the process for preparing a polyamide-based film may further comprise adding a matting agent.

The step of adding the matting agent may be carried out before preparing the polymer solution or may be carried out after preparing the polymer solution. That is, the matting agent is first dissolved in an organic solvent, and the mixture is then reacted to prepare the polymer. Alternatively, the mixture is first reacted in an organic solvent, and the matting agent is then added to the organic solvent.

Specifically, the process may comprise preparing a polyamide-based polymer solution and then adding a matting agent to the organic solvent.

Accordingly, it is possible to lower the glossiness, thereby obtaining a film that has a level of glossiness similar to that of glass. Further, it is possible to enhance the effect of improving the scratches caused by sliding during the film preparation by enhancing the surface roughness and windability and to achieve an aesthetic feeling similar to that of glass. Further, it produces the effect of enhancing the visibility of the display.

The details on the type and content of the matting agent are as described above.

The molar ratio of the dianhydride compound and the dicarbonyl compound used for the preparation of the polymer solution may be 0:100 to 50:50, 0:100 to 45:55, 0:100 to 30:70, 0:100 to 25:75, 0:100 to 20:80, 0:100 to 15:85, 0:100 to 10:90, 0:100 to 8:92, or 0:100 to 5:95.

If the dianhydride compound and the dicarbonyl compound are employed at the above molar ratio, it is possible to obtain a film that has sufficient luminance and minimizes the optical distortion even when the angle from the normal direction of the surface light source is large, and it is advantageous for achieving the desired mechanical and optical properties, particularly the desired level of glossiness, of the polyamide-based film prepared from the polymer solution.

If the above range is not satisfied, such mechanical properties as the number of folding and hardness or such optical properties as brightness, haze, and transparency may be deteriorated.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Once the solution comprising a polyamide-based polymer in an organic solvent has been prepared as described above, a filler dispersion in which a filler has been dispersed is added to the solution.

The filler has an average particle diameter of 60 nm to 180 nm and a refractive index of 1.55 to 1.75. The content thereof is 100 ppm to 3,000 ppm based on the total weight of the solids content of the polyamide-based polymer. In addition, the filler may be barium sulfate.

The details on the filler are as described above.

The filler dispersion may further comprise a dispersant.

The dispersant serves to help the filler in the dispersion to be uniformly dispersed in the solution comprising a polyamide-based polymer.

In such event, the dispersant is preferably a neutral dispersant.

The content of filler solids contained in the filer dispersion is 10% by weight to 30% by weight.

If the content of the filler contained in the filler dispersion is within the above range, the filler may be uniformly dispersed and appropriately mixed with the solution comprising a polyimide-based polymer. In addition, the aggregation of the filler is minimized, no feeling of foreign matter is present on the film surface when a film is prepared, and the optical properties and mechanical properties of the film can be enhanced together.

In addition, the filler dispersion may further comprise a solvent.

The solvent may be an organic solvent. Specifically, it may be at least one selected from the group consisting of dimethylfornmamide (DMF), dimethylacetamide (DMAc), N-methyl-2-pyrrolidone (NMP), m-cresol, tetrahydrofuran (THF), and chloroform. Preferably, the solvent contained in the filler dispersion may be dimethylacetamide (DMAc), but it is not limited thereto.

Next, the polymer solution thus prepared is charged to a tank (S200).

Figure 3:
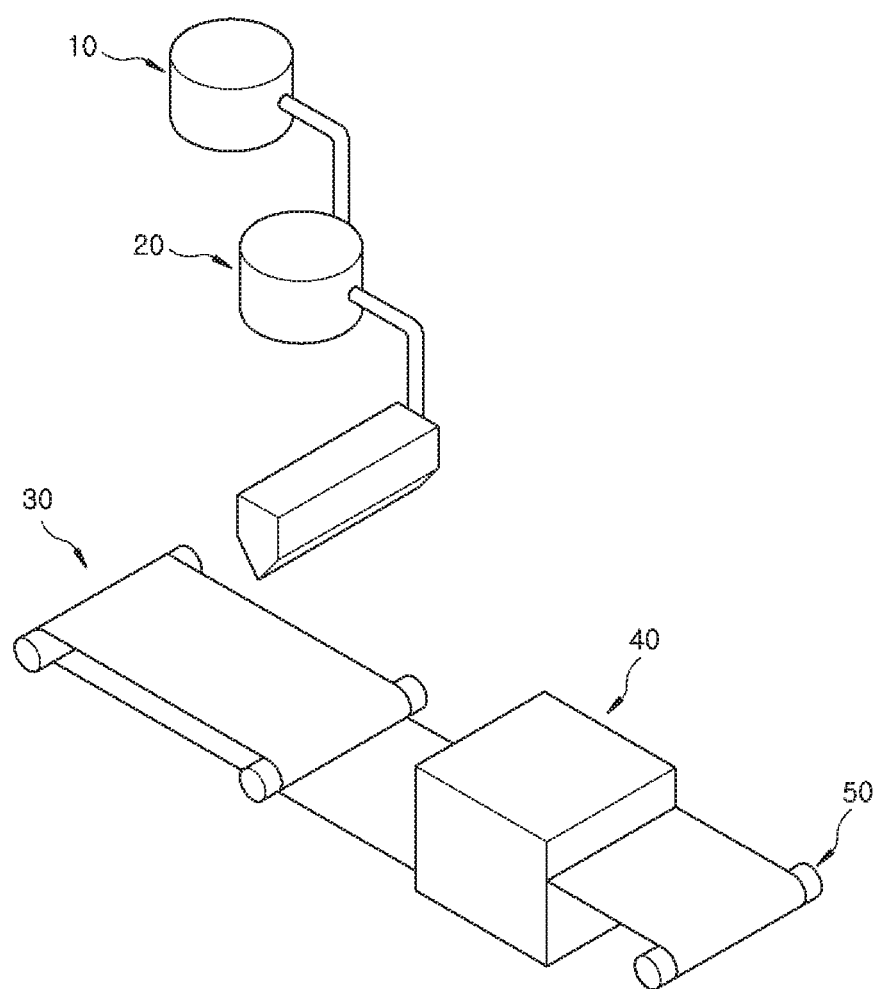
FIG. 3 schematically illustrates process facilities for preparing a polyamide-based film according to an embodiment.

FIG. 3 schematically illustrates preparation process facilities for preparing the polyamide-based film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a polyamide-based film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a polyamide-based film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the polyamide-based film thus produced.

Thereafter, the process may further comprise storing the polymer solution in the tank (20) for 1 hour to 360 hours. Here, the temperature inside the tank may be kept at −20° C. to 20° C.

The process for preparing a polyamide-based film may further comprise extruding and casting the polymer solution in the tank (20) and then drying it to prepare a gel sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel sheet can be uniformly formed to an appropriate thickness. In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel sheet. The polymer solution is dried at a temperature of 70° C. to 90° C. for 15 minutes to 40 minutes to prepare a gel sheet.

The solvent of the polymer solution is partially or totally volatilized during the drying to prepare the gel sheet.

The moving speed of the gel sheet on the casting body at the time of drying may be 0.1 m/min to 15 m/min, for example, 0.5 m/min to 10 m/min, but it is not limited thereto.

The process may further comprise stretching the gel sheet after the step of preparing the gel sheet.

In such event, the step of stretching the gel sheet may be carried out simultaneously with the step of thermally treating the gel sheet, which will be described later, or may be sequentially carried out.

In the step of stretching the gel sheet, the stretching ratio in the transverse direction (TD) is 1.005 to 1.05. In addition, the stretching ratio in the longitudinal direction (MD) is 1.005 to 1.05.

In addition, in the step of stretching the gel sheet, the ratio of stretching in the transverse direction (TD) to that in the longitudinal direction (MD) may be 0.96 to 1.04.

The ratio of stretching in the transverse direction (TD) to that in the longitudinal direction (MD) refers to the stretching ratio in the transverse direction (TD)/the stretching ratio in the transverse direction (TD).

If the stretching ratio in the transverse direction (TD), the stretching ratio in the longitudinal direction (MD), and the ratio of stretching in the transverse direction (TD) to that in the longitudinal direction (MD) are within the above ranges, it is possible to obtain a film that has sufficient luminance and a minimized optical distortion even at a large angle of view.

The process for preparing a polyamide-based film comprises thermally treating the gel sheet while it is moved to prepare a cured film (S500).

Referring to FIG. 3, the thermal treatment of the gel sheet can be carried out by passing it through a thermosetting device (40).

When the gel sheet passes through the thermosetting device (40), it is treated with hot air.

If the thermal treatment is carried out with hot air, the heat may be uniformly supplied. If the heat is not uniformly supplied, a satisfactory surface roughness cannot be achieved, which may raise or lower the surface tension too much.

The thermal treatment of the gel sheet is carried out in a temperature range of 60° C. to 500° C. for 5 to 200 minutes. Specifically, the thermal treatment of the gel sheet may be carried out in a temperature range of 80° C. to 300° C. at a temperature elevation rate of 1.5° C./min to 20° C./min for 10 minutes to 150 minutes. Alternatively, the thermal treatment of the gel sheet may be carried out in a temperature range of 75° C. to 460° C. at a temperature elevation rate of 1.5° C./min to 80° C./min for 10 minutes to 150 minutes.

In such event, the initial temperature of the thermal treatment of the gel sheet may be 60° C. or higher. Specifically, the initial temperature of the thermal treatment of the gel sheet may be 60° C. to 200° C. or 80° C. to 180° C.

In addition, the maximum temperature in the thermal treatment may be 300 to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

That is, referring to FIG. 3, the inlet temperature of the thermosetting device (40) may be the initial temperature of the thermal treatment, and the temperature of a certain region inside the thermosetting device (40) may be the maximum temperature in the thermal treatment.

According to an embodiment, the thermal treatment of the gel sheet may be carried out in two or more steps.

Specifically, the thermal treatment comprises a first hot air treatment step carried out for 5 to 30 minutes in a range of 60° C. to 120° C.; and a second hot air treatment step carried out for 10 minutes to 120 minutes in a range of 120° C. to 350° C.

The thermal treatment under these conditions may cure the gel sheet to have appropriate surface hardness and modulus and may secure high light transmittance, low haze, and an appropriate level of glossiness of the cured film at the same time.

According to another embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The process for preparing a polyamide-based film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a polyamide-based film comprises winding the cooled cured film using a winder (S700).

Referring to FIG. 3, the cooled cured film may be wound using a roll-shaped winder (50).

In such event, the ratio of the moving speed of the gel sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a polyamide-based film, the thickness variation (%) according to the following Relationship 1 may be 3% to 30%. Specifically, the thickness variation (%) may be 5% to 20%, but it is not limited thereto.

Thickness variation (%)=($M1-M2$)/$M2 \times 100$   [Relationship 1]

In Relationship 1, M1 is the thickness (μm) of the gel sheet, and M2 is the thickness (μm) of the cooled cured film at the time of winding.

The polyamide-based film is prepared by the preparation process as described above such that it is excellent in optical and mechanical properties. The polyamide-based film may be applicable to various uses that require flexibility, transparency, and a certain level of luminance and glossiness. For example, the polyamide-based film may be applied to solar cells, displays, semiconductor devices, sensors, and the like.

In particular, since the polyamide-based film can achieve a certain level of luminance, minimize the optical distortion, and achieve a certain level of glossiness, it can be advantageously applied to a cover window for a display device and to a display device. Since it is excellent in folding characteristics, it can be advantageously applied to a foldable display device or a flexible displace device.

The details on the polyamide-based film prepared by the process for preparing a polyamide-based film are as described above.

Hereinafter, the above description will be described in detail by referring to examples. However, these examples are set forth to illustrate the present invention, and the scope of the present invention is not limited thereto.

EXAMPLE

Example 1a

A 1-liter glass reactor equipped with a temperature-controllable double jacket was charged with 779.1 g of dimethylacetamide (DMAc) as an organic solvent at 20° C. under a nitrogen atmosphere. Then, 64 g (0.2 mole) of 2,2'-bis(trifluoromethyl)-4,4'-diaminobiphenyl (TFMB) was slowly added thereto and dissolved. Subsequently, 4.44 g (0.01 mole) of 2,2'-bis(3,4-dicarboxyphenyl)hexafluoropropane dianhydride (6FDA) was slowly added thereto, and the mixture was stirred for 1 hour. Then, 12.2 g (0.06 mole) of isophthaloyl chloride (IPC) was added, followed by stirring for 1 hour. And 26.43 g (0.13 mole) of terephthaloyl chloride (TPC) was added, followed by stirring for 1 hour, thereby preparing a polymer solution.

Subsequently, a barium sulfate dispersion (solids content: 18.2% by weight and organic solvent: DMAc) was added to the polymer solution and stirred.

The polymer solution thus obtained was coated onto a glass plate and then dried with hot air at 80° C. for 30 minutes, which was detached from the glass plate. It was stretched by 5% in the MD direction and 5% in the TD direction, fixed to a pin frame, and dried with hot air in a range of 80° C. to 300° C. at a temperature elevation rate of 2° C./min, to thereby obtain a polyamide-based film having a thickness of 50 sm.

As to the contents of TFMB, 6FDA, IPC, and TPC, the number of moles of the dianhydride compound and the dicarbonyl compounds based on 100 moles of the diamine compound is shown in Table 1.

In addition, the content and average particle diameter of the filler are shown in Table 1.

Example 2a

Films were prepared in the same manner as in Example 1a, except that the types and contents of the respective reactants and the like were changed as shown in Table 1 below.

Example 1b

A 1-liter glass reactor equipped with a temperature-controllable double jacket was charged with 779.1 g of dimethylacetamide (DMAc) as an organic solvent at 20° C. under a nitrogen atmosphere. Then, 64 g (0.2 mole) of 2,2'-bis(trifluoromethyl)-4,4'-diaminobiphenyl (TFMB) was slowly added thereto and dissolved. Subsequently, 21.3 g (0.048 mole) of 2,2'-bis(3,4-dicarboxyphenyl)hexafluoropropane dianhydride (6FDA) was slowly added thereto, and the mixture was stirred for 1 hour. Then, 2.44 g (0.012 mole) of isophthaloyl chloride (IPC) was added, followed by stirring for 1 hour. And 28.42 g (0.14 mole) of terephthaloyl chloride (TPC) was added, followed by stirring for 1 hour, thereby preparing a polymer solution. Thereafter, 500 ppm of silica (average particle diameter of 100 nm to 150 nm) was added as a matting agent to the polymer solution thus prepared based on the total weight of the polyamide-based polymer, which was stirred.

The polymer solution thus obtained was coated onto a glass plate and then dried with hot air at 80° C. for 30 minutes. It was detached from the glass plate, fixed to a pin frame, and thermally treated with hot air in a temperature range of 80° C. to 300° C. at a temperature elevation rate of 2° C./min to obtain a polyamide-based film having a thickness of 50 μm.

As to the contents of TFMB, 6FDA, IPC, and TPC, the number of moles of the dianhydride compound and the dicarbonyl compounds based on 100 moles of the diamine compound is shown in Table 3.

Examples 2b to 6b and Comparative Example 1b

Films were prepared in the same manner as in Example 1b, except that the types and contents of the respective reactants and the like were changed as shown in Table 3 below.

Evaluation Example

The films prepared in Examples 1a and 2a were each measured and evaluated for the following properties. The results are shown in Table 1 below.

In addition, the films prepared in Examples 1b to 6b and Comparative Examples 1b, along with a conventional GLASS (Reference Example), were each measured and evaluated for the following properties. The results are shown in Table 3 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Transmittance and Haze

The light transmittance and the haze at 550 nm were measured using a haze meter NDH-5000W manufactured by Nippon Denshoku Kogyo.

Evaluation Example 3: Measurement of Yellow Index

The yellow Index (YI) was measured with a spectrophotometer (UltraScan PRO, Hunter Associates Laboratory) using a CIE colorimetric system.

Evaluation Example 4: Measurement of Refractive Indices ($n_x$, $n_y$, and $n_z$), in-Plane Retardation, and Thickness Direction Retardation The in-plane retardation ($R_o$) and the thickness direction retardation ($R_{th}$) were measured with a retardation measuring device (Axoscan of Axometrics, measuring wavelength: 550 nm). In addition, the refractive index as a basic data for measuring the retardation was measured with an Abbe refractometer (NAR-4T manufactured by Atago Co., Ltd., measuring wavelength: 589.3 nm).

Evaluation Example 5: Measurement of Glossiness

A film sample of 20 mm-60 mm-50 μm was measured for the glossiness at 20°, glossiness at 60°, and glossiness at 85° from the light source using a VG-7000 device.

Evaluation Example 6: Measurement of Surface Roughness

The surface roughness (Ra) was measured by loading a stylus tip on a film sample using a Kosaka SE500A.

TABLE 1

| | Example 1a | Example 2a |
|---|---|---|
| Diamine | TFMB 100 | TFMB 100 |
| Dianhydride | 6FDA 5 | 6FDA 0 |
| Dicarbonyl compound | IPC 30 | IPC 30 |
| | TPC 65 | TPC 70 |
| Thickness (μm) | 50 | 50 |
| Transmittance (%) | 89 | 89.1 |
| Haze (%) | 0.4 | 0.4 |
| Yellow index | 2.4 | 2.9 |
| Filler content (ppm) | 300 | 2000 |
| Filler avg. particle diameter (nm) | 140 | 140 |
| $n_x$ | 1.643 | 1.647 |
| $n_y$ | 1.637 | 1.636 |
| $n_z$ | 1.554 | 1.549 |
| In-plane retardation ($R_o$) (nm) | 300 | 550 |
| Thickness direction retardation ($R_{th}$) (nm) | 4300 | 4625 |

In addition, the films prepared in Examples 1a and 2a were each measured and evaluated for the luminance. The results are shown in Table 2 below.

Evaluation Example 7: Measurement of Luminance

The prepared polyamide-based film was disposed on a surface light source, and white light was irradiated from the surface light source. A luminance meter was placed at a distance of about 1 m in the normal direction from the center point of the surface light source, and the luminance value ($L_0$) in the normal direction was measured. In addition, while the luminance meter was moved in the circumferential direction with reference to the center point of the surface light source, the luminance values in the directions at an angle of 10°, 20°, 30°, 40°, 50°, and 60° from the normal direction of the surface light source were each measured. In addition, when the luminance value ($L_0$) in the normal direction is 100%, the luminance values measured in each direction are converted and are shown in Table 2 below.

A CA-310 manufactured by Konica Minolta was used for the measurement of luminance.

In addition, two luminance values measured in each direction at a certain angle from the normal direction were averaged as the luminance value for the angle.

The Reference Example in Table 2 below is a value measured in a state in which a polyamide-based film was not disposed on a surface light source.

TABLE 2

| Angle | Reference Example | Example 1a | Example 2a |
|---|---|---|---|
| Luminance at 0° (%) | 100 | 100 | 100 |
| Luminance at 10° (%) | 93.0 | 93.4 | 93.5 |
| Luminance at 20° (%) | 69.8 | 71.0 | 71.2 |
| Luminance at 30° (%) | 43.3 | 45.6 | 45.6 |
| Luminance at 40° (%) | 31.6 | 34.0 | 34.0 |
| Luminance at 50° (%) | 24.8 | 27.2 | 27.2 |
| Luminance at 60° (%) | 18.6 | 20.3 | 20.3 |

As can be seen from Tables 1 and 2, the polyamide-based films of Examples 1a and 2a had sufficiently high luminance values even at an angle away from the normal direction. Specifically, the luminance value measured in the direction of 40° from the normal direction of the surface light source was 34% or more, the luminance value measured in the direction of 50° from the normal direction of the surface light source was 27% or more, and the luminance value measured in the direction of 60° from the normal direction of the surface light source was 20% or more, which were all high.

It was confirmed from these results that when the polyamide-based film according to the embodiment is applied to a cover window for a display device and to a display device, it is possible to secure a wide angle of view, and the visibility is excellent even when viewed from the side as well as from the front.

Further, the in-plane retardation and the thickness direction retardation were 600 nm or less and 4700 nm or less, respectively, which indicates that the optical distortion and color distortion on the screen are minimized when applied to a display device.

TABLE 3

| | Ex. 1b | Ex. 2b | Ex. 3b | Ex. 4b | Ex. 5b | Ex. 6b | C. Ex. 1b | Reference Example |
|---|---|---|---|---|---|---|---|---|
| Diamine | TFMB 100 | TFMB 100 | TFMB 100 | TFMB 100 | TFMB 100 | TFMB 100 | TFMB 100 | GLASS |
| Dianhydride | 6FDA 24 | 6FDA 17 | 6FDA 3 | — | 6FDA 25 BPDA 20 | 6FDA 3 | 6FDA 3 | — |
| Dicarbonyl compound | TPC 70 IPC6 | TPC 75 IPC8 | TPC 75 IPC 22 | TPC 75 IPC 25 | TPC 55 | TPC 75 IPC 22 | TPC 75 IPC 22 | — |
| Imide:amide | 24:76 | 17:83 | 3:97 | 0:100 | 45:55 | 3:97 | 3:97 | — |
| Matting agent | Silica 500 ppm | Silica 500 ppm | Silica 500 ppm | Silica 500 ppm | Silica 300 ppm | Silica 3,200 ppm | Silica 50 ppm | — |
| Thickness (μm) | 50 | 50 | 50 | 50 | 50 | 50 | 50 | 1000 |
| Haze (%) | 0.43 | 0.46 | 0.40 | 0.48 | 0.72 | 1.12 | 0.47 | 0.51 |
| TT (%) | 89.0 | 89.0 | 89.1 | 89.0 | 89.0 | 89.6 | 89.1 | 92.0 |
| YI | 2.34 | 2.49 | 2.95 | 2.92 | 3.57 | 2.87 | 2.65 | 0.07 |
| 20° | 124 | 111 | 98 | 105 | 121 | 91 | 133 | 97.2 |
| 60° | 114 | 105 | 99 | 107 | 112 | 93 | 113 | 97.7 |
| 85° | 101 | 101 | 100 | 100 | 101 | 99 | 100 | 100 |
| $GL_{20-60}$ | 10 | 6 | 1 | 2 | 9 | 2 | 20 | 0.5 |
| $GL_{60-85}$ | 13 | 4 | 1 | 7 | 11 | 6 | 13 | 2.3 |
| $GL_{20-85}$ | 23 | 10 | 2 | 5 | 20 | 8 | 33 | 2.8 |
| $GL_{max/min}$ (%) | 81.45 | 90.99 | 98 | 93.46 | 83.47 | 91.92 | 75.19 | 97.2 |
| Ra (μm) | 0.02 | 0.04 | 0.06 | 0.05 | 0.02 | 0.08 | 0.02 | 0.01 |

As can be seen from Table 3 above, the polyamide-based films of Examples 1b to 6b all achieved a level of glossiness similar to that of GLASS in the Reference Example.

Further, the films of Examples 1b to 6b were excellent in such optical properties as transmittance, haze, and yellow index, and had overall excellent surface roughness.

In contrast, since the content of the matting agent was relatively small in Comparative Example 1b, the polyamide-based film had a low surface roughness of 0.02 μm, whereas it had an especially high glossiness value at 20°. Since it is difficult to achieve a level of aesthetic feeling similar to that of glass, it is unsuitable for application as a substitute film for glass.

REFERENCE NUMERALS OF THE DRAWINGS

1: surface light source
2: polyamide-based film
3: normal line
4: luminance meter
L: distance from the center point
θ: angle from the normal direction from the surface light source
10: polymerization apparatus
20: tank
30: belt
40: thermosetting device
50: winder
100: polyamide-based film
101: first side
102: second side
200: functional layer
300: cover window 400: display unit
500: adhesive layer

The invention claimed is:

1. A polyamide-based film, which comprises a polyamide-based polymer, wherein when the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more,
wherein the polyamide-based film further comprises a filler,
wherein the filler comprises barium sulfate,
wherein the content of the filler is 100 to 3,000 ppm based on the total weight of the solids content of the polyamide-based polymer, and
wherein the content of the residual solvent in the polyamide-based film is 1,500 ppm or less,
wherein the molar ratio of an imide-based repeat unit and an amide-based repeat unit in the polyamide-based polymer is 0:100 to 25:75, and wherein the polyamide-based film has an in-plane retardation of 800 nm or less and a thickness direction retardation of 5,000 nm or less.

2. The polyamide-based film of claim 1, wherein the luminance value ($L_{20}$) measured in the direction of 20° from the normal direction of the surface light source is 70% or more, and the luminance value ($L_{60}$) measured in the direction of 60° from the normal direction of the surface light source is 19% or more.

3. The polyamide-based film of claim 1, wherein the surface of the polyamide-based film has a glossiness at 20° ($GL_{20}$) of 90 to 130, a glossiness at 60° ($GL_{60}$) of 90 to 120, and a glossiness at 85° ($GL_{85}$) of 90 to 110.

4. The polyamide-based film of claim 1, wherein the filler has an average particle diameter of 60 to 180 nm.

5. The polyamide-based film of claim 1, which has a transmittance of 80% or more, a haze of 1% or less, and a yellow index or 5 or less measured at 550 nm.

6. A process for preparing the polyamide-based film of claim 1, which comprises:
preparing a solution comprising a polyamide-based polymer in an organic solvent;
adding a filler dispersion in which a filler comprising barium sulfate is dispersed to the solution;
charging the solution comprising the filler dispersion into a tank;
extruding and casting the solution in the tank and then drying it to prepare a gel sheet; and
thermally treating the gel sheet.

7. The process of claim 6 for preparing the polyamide-based film, which comprises stretching the gel sheet after the step of preparing the gel sheet.

8. The process of claim 7 for preparing the polyamide-based film, wherein in the step of stretching the gel sheet, the stretching ratio in the transverse direction (TD) is 1.005 to 1.05, the stretching ratio in the longitudinal direction (MD) is 1.005 to 1.05, and the ratio of stretching in the transverse direction (TD) to that in the longitudinal direction (MD) is 0.96 to 1.04.

9. A cover window for a display device, which comprises a polyamide-based film and a functional layer,
wherein the polyamide-based film comprises a polyamide-based polymer, and
when the polyamide-based film is placed on a surface light source, light is irradiated from the surface light source, and the luminance value ($L_0$) measured in the normal direction of the surface light source is 100%, the luminance value ($L_{50}$) measured in the direction of 50° from the normal direction of the surface light source is 25% or more,
wherein the polyamide-based film further comprises a filler,
wherein the filler comprises barium sulfate,
wherein the content of the filler is 100 to 3,000 ppm based on the total weight of the solids content of the polyamide-based polymer, and
wherein the content of the residual solvent in the polyamide-based film is 1,500 ppm or less,
wherein the molar ratio of an imide-based repeat unit and an amide-based repeat unit in the polyamide-based polymer is 0:100 to 25:75, and wherein the polyamide-based film has an in-plane retardation of 800 nm or less and a thickness direction retardation of 5,000 nm or less.

* * * * *